Patented Jan. 19, 1937

2,067,916

UNITED STATES PATENT OFFICE 2,067,916

LAWN MOWER ATTACHMENT

Grover C. Haffner and Marie V. Haffner,
Los Angeles, Calif.

Refiled for abandoned application Serial No. 624,955, July 27, 1932. This application February 28, 1936, Serial No. 66,278

10 Claims. (Cl. 56—199)

This application is refiled for abandoned application Serial No. 624,955, filed July 27, 1932.

This invention relates to lawn mowers and has particular reference to means attachable to such devices for shifting the cut grass deposited by the mowing mechanism in the front part of the ordinary grass catcher to the rear portion of the same.

The general object of the invention is the provision of a simple and inexpensive attachment to lawn mowers for the purpose specified and capable of operation in connection with the grass catcher ordinarily found on the market at the present time.

Figure 1:
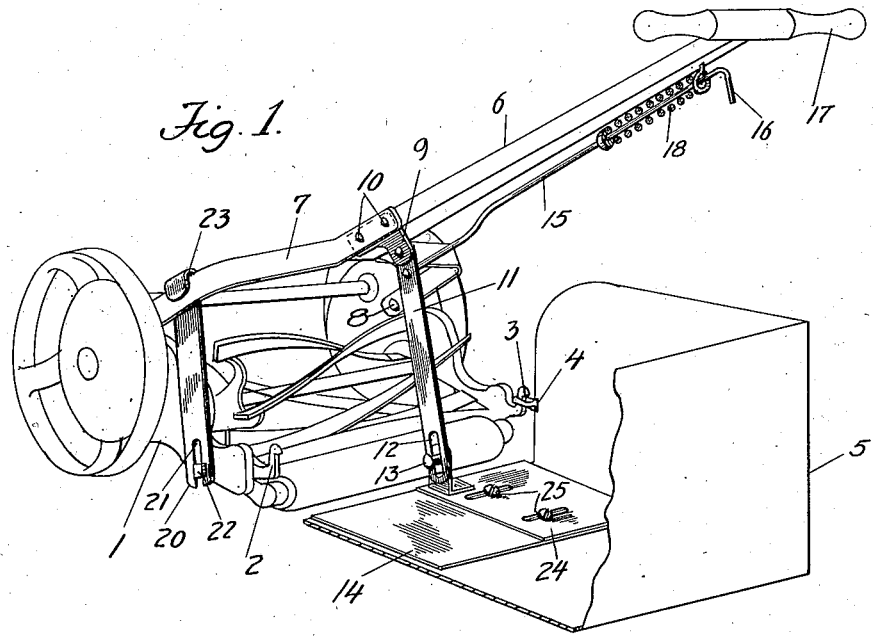
Figure 2:
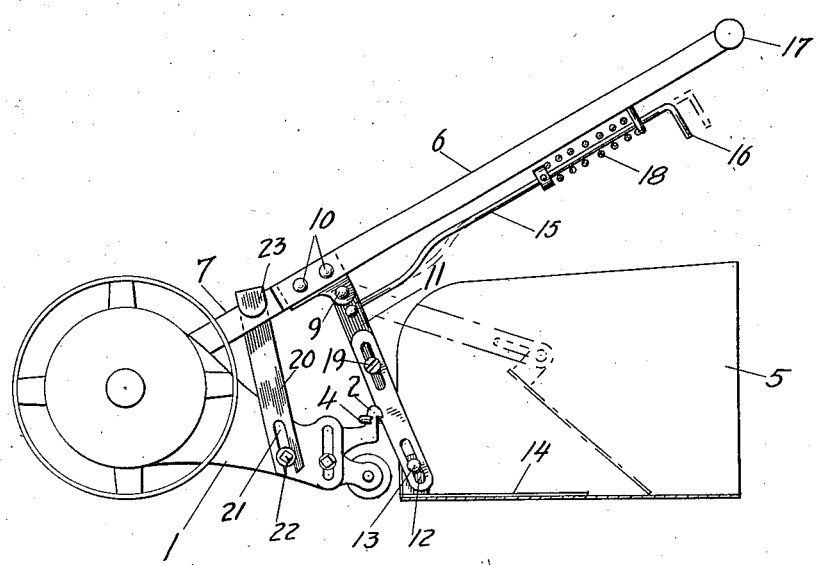

The further objects and important features of the invention are fully set forth in the following description and illustrated in the appended drawing, of which:

Fig. 1 is a perspective view of a lawn mower fitted with the device of the invention and having attached thereto the usual grass catcher, one corner of the latter being broken away for the sake of clearness, and Fig. 2 is a side elevation substantially in agreement with Fig. 1, the front portion of the grass catcher being broken away in order better to illustrate the operation of the device of our invention.

The lawn mower 1 is of any standard type and is shown fitted with a pair of hooks 2 and 3 shaped to receive suitable attachment elements 4 of the grass catcher 5. The lawn mower is shown made with the usual handle 6, which projects from a yoke 7, which in turn is pivoted to the lawn mower frame at 8 as usual in practice. For the purpose of attaching the device of the invention, we have shown a plate 9 clamped between the yoke 7 and handle 6 by means of the bolts 10 which hold these parts together, and this plate is perforated pivotally to receive an arm 11, the lower free end of which is shown perforated at 12 to ride on a pin 13 of a bracket which forms part of a plate 14. A rod 15 is shown bent at its inner end to ride in a perforation of the arm 11, and it extends upwardly substantially parallel with the handle 6 terminating at the top in a grip 16 in close proximity to the handle bar 17.

From this short description, it should be clear, to anyone versed in the art, that a pull on the grip 16 will cause the arm 11 to swing rearwardly on its pivot and to carry the plate 14 along with it. As the connection between this plate and the arm 11 is at the front edge of the plate, it is also noticed that the rearward movement of the plate is accompanied by a tilting movement as indicated in dotted outline in Fig. 2.

Normally, the plate 14 is resting on the bottom of the grass catcher directly behind the mowing mechanism in position to receive the grass which is thrown rearwardly by this mechanism. At any time the operator finds it convenient or necessary, he is free to pull the grip 16 to throw this accumulated grass to the rear end of the catcher. Suitable means, such as a spring 18, should be provided to return the plate 14 to its initial position.

Because lawn mowers vary in size and in shape, means are herein shown for adjusting the device of the invention to suit the standard makes of lawn mowers. To this end, we have shown the perforation 12 of the arm 11 elongated, to accommodate differences in the distance between the connecting pin 13 and the center of the lawn mower drive wheels. Should such means be found insufficient, it is also possible to provide further adjustment by making the arm in two pieces adjustably clamped together as indicated at 19 in Fig. 2. It is furthermore noticed that the plate 9 is shown one-sided, making it possible, by a mere reversal of this plate further to adjust the device to various sizes of lawn mowers. Grass catchers are carried in different widths making it desirable to provide adjustment of the plate 14 and such adjustment may easily be afforded by making the plate in two parts as indicated in Fig. 1. Here one member of the plate 14 is shown overlapping the other member and the members are held frictionally combined by suitable studs 25.

As above stated, the yoke 7 is pivotally mounted on the lawn mower frame. This is the usual construction and it permits the handle 6 to be swung into any desired position. The device of our invention, however, operates best when the handle is set substantially at the angle most convenient for mowing the grass. While the operator may readily become accustomed to this preferred position, we have found it advantageous to provide means for retaining the device in this position. Such means are here shown to consist of a strap 20, the lower end of which is slotted, as at 21, to ride on a bolt 22, such as is usually found on the standard type of lawn mower. The upper end of this strap 20 terminates in a hook 23, which is shown riding on one side member of the handle yoke 7. When the bolt 22 is screwed in tightly, it is readily seen that this strap prevents the operator from elevating the handle higher than required for the proper operation of the device. The slot 21 permits of the use of this strap in connection with lawn mowers of various sizes. In case it is desired to further elevate the handle, it is only necessary, in the first instance, to depress it slightly until the hook 23 is free of the yoke member, whereupon the slender strap may be pressed inwardly far enough to permit the yoke to pass and the handle to be elevated.

From the foregoing description, it should be clear that we provide an attachment to lawn mowers for disposal of grass cut by the machine.

We are aware that several devices have been proposed for this purpose, forming part of the grass catcher, making each grass catcher an individual device specially fitted for its purpose. Such combination is very undesirable, partly because it interferes with the free use of the grass catcher, which should be nothing more than a receptacle for the cut grass to be carried, when full, to some distant point for disposal of the grass. Furthermore, such catcher usually comprises a metal base to which a wire frame is fastened to support a canvas cover. As this device generally is thrown around and handled pretty roughly, it is readily seen that the attachment of such structure, as here considered, to such grass catcher is not a practical proposition.

The structure of our device is an attachment to law mowers, and it will operate in connection with any grass catcher capable of use in connection with this lawn mower. It is adjustable to any standard size lawn mower and grass catcher and does not interfere with the handling of the grass catcher when the latter is detached from the lawn mower. The drawing is merely illustrative of our invention and we wish it understoor the various elements of the device may be modified to suit individual conditions so long as we remain within the scope of the following claims.

We claim:

1. In combination with a lawn mower having an operating handle, an attachment comprising, an arm detachably mountable on the lawn mower handle to swing in a vertical plane, a plate pivotally mounted at its front edge on the outer free end of said arm, and means associated with the arm for swinging said arm as aforesaid thereby to move the said plate rearwardly and at the same time to tilt the plate.

2. For attachment to a lawn mower having an operating handle, a member attachable to said handle, an arm pivotally secured at one end to said member and being lengthwise slotted at its opposite free end, a plate having at the front edge a bracket made with a stud fitted to ride in said slot, and means associated with the arm for swinging said arm to move the said plate rearwardly and at the same time to tilt the plate.

3. An attachment for a lawn mower having an operating handle comprising a member detachably mountable on the mower handle, an arm pivotally secured at one end to said member, a plate fitted at its front edge to be pivotally secured to the outer end of said arm, a rod journaled at one end on said arm close to its pivotal point and extending along the mower handle to point near the handle bars of the mower where it terminates in a grip for drawing the rod towards said handle bar thereby to swing the said arm and plate rearwardly and at the same time to tilt said plate, and resilient means for returning said parts to their initial positions.

4. In combination with a lawn mower provided with an operating handle, an attachment comprising a member detachably mountable on the lawn mower handle, an arm pivoted at one end to said member, a plate at its front edge pivotally secured to the opposite end of said arm, means associated with the arm for swinging the arm thereby to move the said plate rearwardly and at the same time to tilt the plate, and means for returning said movable parts to their original positions.

5. In combination with a handle operated lawn mower, an attachment comprising a member detachably mountable on the lawn mower handle, an arm mounted on said member for swinging motion in a vertical plane, a plate pivotally secured at its front edge to the outer free end of said arm, means associated with the arm for swinging the arm to move the said plate rearwardly and at the same time tilt the plate, means to return the plate and arm to their initial position, and means for adjusting said plate and arms relative to the size of lawn mower to which they are attachable.

6. In combination with a lawn mower having an operating handle pivotally mounted to swing in a vertical plane, a member detachably mountable on said handle to swing in the same plane, a plate fitted at its front edge to journal on the free end of said member, means associated with the member for swinging the member to move the said plate rearwardly and at the same time to tilt the plate, and detachable means to limit the upward movement of the said handle so as to retain the parts enumerated in proper operative relation.

7. The combination with a handle operated lawn mower and a grass catcher attachable thereto, of an attachment comprising a member detachably mountable on the lawn mower handle, a plate fitted at its front edge to journal on the outer free end of said member, said plate normally resting upon the base plate of the grass catcher of the lawn mower directly behind the mowing mechanism, means associated with the member to swing the said member to move the said plate rearwardly along the catcher base and at the same time to tilt the plate, and means to return the plate and the said member to their initial positions.

8. In combination with a handle operated lawn mower, an attachment comprising, an arm mountable on the lawn mower handle to swing in a vertical plane, a plate fitted at its front edge to be mounted on the outer free end of said arm and normally horizontally disposed, and an operating rod pivoted at one end to said arm and extending along said handle substantially to the cross bar of the handle for the purpose of swinging said arm and thereby to draw and tilt the said plate rearwardly.

9. In combination with a handle operated lawn mower, an attachment, a member detachably mounted on the lawn mower handle to swing vertically, a grass thrower fitted at its front edge to be pivotally mounted on the outer end of said member, and manually operable means attached to said handle and operatively connected with said member to swing said member thereby to draw and tilt said thrower rearwardly.

10. In combination with a lawn mower having an operating handle, an attachment comprising, a member normally horizontally disposed, connecting means for detachably holding the front edge of said member suspended from the lawn mower handle, and means attached to said handle and associated with said connecting means for manually moving and tilting said member rearwardly.

GROVER C. HAFFNER.
MARIE V. HAFFNER.